United States Patent
Klein et al.

(10) Patent No.: US 10,155,429 B2
(45) Date of Patent: Dec. 18, 2018

(54) AIR-CONDITIONING SYSTEM FOR A VEHICLE

(71) Applicant: Mahle Behr France Rouffach SAS, Rouffach (FR)

(72) Inventors: Henri Klein, Riedisheim (FR); Emmanuel Fleith, Holtzwihr (FR)

(73) Assignee: Mahle Behr France Rouffach SAS (FR)

( * ) Notice: Subject to any disclaimer, the term of this patent is extended or adjusted under 35 U.S.C. 154(b) by 403 days.

(21) Appl. No.: 14/553,330

(22) Filed: Nov. 25, 2014

(65) Prior Publication Data
US 2015/0147950 A1    May 28, 2015

(30) Foreign Application Priority Data

Nov. 28, 2013  (EP) ..................................... 13194856

(51) Int. Cl.
*B60H 1/24* (2006.01)
*B60H 1/00* (2006.01)

(52) U.S. Cl.
CPC ........... *B60H 1/24* (2013.01); *B60H 1/00485* (2013.01); *B60H 1/00685* (2013.01); *B60H 1/00849* (2013.01)

(58) Field of Classification Search
CPC .. B60H 1/24; B60H 1/00485; B60H 1/00685; B60H 1/00849; B60H 1/00671; B60H 1/00842; B60H 2001/00085; B60H 2001/00721; B60H 1/00664; F16K 17/0486; F16K 15/00; F16K 15/185; F16K 17/04; F16K 17/0493; F16K 17/30
See application file for complete search history.

(56) References Cited

U.S. PATENT DOCUMENTS 5,507,318 A * 4/1996 Israelson ............. F04B 53/1065
                                                          137/854
6,386,966 B1 * 5/2002 Kuwayama ........ B60H 1/00514
                                                          181/225
(Continued)

FOREIGN PATENT DOCUMENTS

DE    19707405 A1 *  8/1998  ......... B60H 1/00685
DE    69919826 T2    9/2005
(Continued)

OTHER PUBLICATIONS

Machine translation of EP 2402183 A1.*
JPS5776120MT, machine translation of JPS5776120U, from Espacenet.*
(Continued)

*Primary Examiner* — Gregory Huson
*Assistant Examiner* — Elizabeth M May
(74) *Attorney, Agent, or Firm* — Fishman Stewart PLLC (57) ABSTRACT

An air-conditioning system for air-conditioning an interior of a vehicle may include a fan for driving air. The system may include a control device that may include a circulating air inlet for drawing in circulating air from the interior, a fresh air inlet for drawing in fresh air from an environment of the vehicle, and an air outlet. The control device may include a control valve adjustable between a circulating position and a fresh air position. The control valve may include at least one non-return check valve. The non-return check valve may permit a flow to pass through the control valve in one direction and block the flow in an opposite direction.

14 Claims, 3 Drawing Sheets

(56) References Cited

U.S. PATENT DOCUMENTS

| | | | |
|---|---|---|---|
| 6,419,006 B1 | 7/2002 | Loup et al. | |
| 8,002,615 B2* | 8/2011 | Jeong | B60H 1/00849 454/139 |
| 2003/0037918 A1* | 2/2003 | Lee | B60H 1/00064 165/202 |
| 2005/0189024 A1* | 9/2005 | Dippel | B60H 1/249 137/855 |
| 2010/0248608 A1* | 9/2010 | Belanger | B60H 1/00678 454/159 |
| 2012/0214394 A1 | 8/2012 | Kanemaru et al. | |
| 2015/0044958 A1* | 2/2015 | Kehimkar | B60H 1/00021 454/143 |

FOREIGN PATENT DOCUMENTS

| | | | | |
|---|---|---|---|---|
| DE | 102009024255 A1 | | 12/2010 | |
| DE | 102010042163 A1 | | 4/2012 | |
| EP | 2402183 A1 | * | 1/2012 | ......... B60H 1/00685 |
| EP | 2402183 A1 | | 1/2012 | |
| FR | 2910384 A1 | | 6/2008 | |
| JP | S5776120 U | * | 5/1982 | |
| JP | 2007-168735 A | | 7/2007 | |

OTHER PUBLICATIONS

English abstract for JP-2007-168735.
English abstract for EP-2402183.
English abstract for DE-102009024255.
English abstract for FR-2910384.
English abstract provided for DE102010042163.

* cited by examiner

AIR-CONDITIONING SYSTEM FOR A VEHICLE

CROSS-REFERENCE TO RELATED APPLICATIONS

This application claims priority to European Patent Application No. 13194856.4, filed Nov. 28, 2013, the contents of which are hereby incorporated by reference in their entirety.

TECHNICAL FIELD

The present invention relates to an air-conditioning system for air-conditioning an interior of a vehicle, in particular of a passenger car, with the features of the introductory clause of claim 1. The invention relates in addition to a control device for such an air-conditioning system and a control valve for such an air-conditioning system or respectively for such a control device. In addition, the present invention relates to a use of a control valve or of a control device in such an air-conditioning system.

BACKGROUND

An air-conditioning system of a vehicle typically comprises a fan for the driving of air. The air which is to be air-conditioned can be drawn in here from an environment of the vehicle, this being so-called "fresh air". Likewise, the air which is to be air-conditioned can be drawn in from the interior of the vehicle, this being so-called "circulating air". In order to be able to switch over between a drawing in of fresh air and a drawing in of circulating air, the air-conditioning system can be equipped with a control device, which has a circulating air inlet for the drawing in of circulating air from the interior, a fresh air inlet for the drawing in of fresh air from the environment of the vehicle, and an air outlet for passing the drawn in circulating air or respectively fresh air on to the fan. Furthermore, such a control device can be equipped with a control valve, which is adjustable between a circulating air position, in which it blocks a fresh air path leading from the fresh air inlet to the air outlet, i.e. closes it, and frees a circulating air path leading from the circulating air inlet to the air outlet, i.e. opens it, and a fresh air position, in which it closes the circulating air path and opens the fresh air path.

For reasons of comfort, it is frequently desired that also for the case where the control valve is adjusted into the fresh air position a certain proportion of circulating air is drawn in, so that ultimately also in the fresh air position a mixture of fresh air and circulating air is supplied to the fan.

In order to realize this, it is basically conceivable to configure the control valve so that in the fresh air position it cannot completely close the circulating air path, so that therefore a certain leakage is accepted. A problem here is that, depending on the pressure conditions in the fresh air position, fresh air can emerge through the circulating air inlet into the interior of the vehicle through the leaky control valve, which is undesirable. In order to avoid such a through-flow of the circulating air inlet, it is basically possible to arrange a non-return check valve upstream of the circulating air inlet or between the circulating air inlet and the control valve, which non-return check valve permits a through-flow in a direction leading to the air outlet and blocks a through-flow in an opposite direction leading the circulating air inlet. However, the integration of such a non-return check valve requires a comparatively large amount of installation space.

From DE 10 2010 042 163 A1 a non-return check valve is known, which can basically be used in such a control device, in order to arrange it there for example upstream of the circulating air inlet.

From DE 699 19826T2 an air-conditioning system is known which has a mixing device, which comprises a cold air inlet for cold air, a hot air inlet for hot air and an air outlet for passing on the supplied cold air and/or hot air. In addition, this mixing device is equipped with a mixing valve, into which a bypass contour is worked, wherein this bypass contour is only opened in intermediate positions of the mixing valve, in order to enable an additional cold air flow, whereby the mixing with the hot air flow is to be improved.

SUMMARY

The present invention is concerned with the problem of specifying an improved or at least a different embodiment for an air-conditioning system of the type named in the introduction or respectively for an associated control device or respectively for an associated control valve, which is distinguished in particular by a compact and/or economically priced structural form.

This problem is solved according to the invention by the subject matter of the independent claim. Advantageous embodiments are the subject matter of the dependent claims.

The invention is based on the general idea of integrating at least one non-return check valve into the control valve, such that the control valve is also able to be flowed through in its fresh air position along the circulating air path in the direction of the air outlet. Therefore, a certain proportion of circulating air can also be admixed to the fresh air in the fresh air position, in which the control valve per se blocks the circulating air path, when a corresponding negative pressure prevails on an inner side of the control valve facing the air outlet, said negative pressure enabling a drawing in of circulating air through the non-return check valve. Through the integration of the non-return check valve into the control valve, no additional installation space is required for realizing the non-return blocking function, so that the control device according to the invention or respectively the air-conditioning system according to the invention is able to be realized in a particularly compact manner. Furthermore, through the integration of the non-return check valve into the control valve, the effort in manufacturing is reduced, whereby also the manufacturing costs can also be reduced.

The non-return control valve is arranged in the control valve so that in the fresh air position it permits a circulating air flow from the circulating air inlet through the control valve to the air outlet, whereas in the fresh air position it blocks a circulating air flow in the opposite direction, i.e. in the direction of the circulating air inlet.

According to an advantageous embodiment, the respective non-return check valve can have a valve member which is arranged adjustably or respectively movably on the control valve and cooperates with a passage opening formed in the control valve, in order to open the latter in the through-flow direction and to block it in the opposite direction. Hereby, a particularly simple structure is produced to realize the non-return check valve. The passage opening can have an opening edge configured as a valve seat, whereby a tight blocking of the passage opening in the opposite direction is simplified. The passage opening which is to be controlled by the respective valve member has a distinctly smaller cross-section which is able to be flowed through than the circulating air inlet, whereby the expenditure for realizing the non-return check valve is reduced.

According to a further development, the valve member can be configured so as to be elastic at least in certain regions, i.e. partially or completely, and can be arranged on an inner side of the control valve facing the air outlet. For example, the valve member can be an elastic plastic part which is flexible or respectively which has a suitable low flexural rigidity. The elastic valve member or respectively the elastic region of the valve member is virtually rubbery-elastic and is deformed elastically by the pressure differences occurring at the valve member, in order to block or free a through-flow of the non-return check valve, depending on the orientation of the apposed pressure difference. Preferably, the elastic valve member is relaxed and undeformed in its blocking position, whereas it is elastically deformed in its open position and thereby is prestressed into its blocking position. It is likewise conceivable to arrange the valve member to be configured such that it is already elastically deformed in the blocking position and is prestressed into the blocking position so that it is deformed elastically more intensively in the open position and is accordingly prestressed more intensively into the blocking position. In any case, the elastic valve member or respectively its elastic region is more elastic or respectively more flexible than the control valve, which is likewise preferably produced from a plastic. In particular, the valve member is therefore produced from a more elastic plastic than the control valve. The term "elastic" is therefore to be understood in this context as "rubbery-elastic", and namely such that already the pressure differences affecting the valve member and which are to be controlled are sufficient to deform the valve member elastically in the elastic region.

Generally, therefore, provision can be made in an embodiment that the valve member is configured and arranged so that it deforms elastically during the adjusting between a blocking position, in which it blocks the passage opening, and an open position, in which it opens the passage opening, wherein in the open position the valve member is prestressed in the direction of the blocking position. In particular, in a further development provision can be made that the valve member is configured and arranged so that it is already elastically deformed in the blocking position and is thereby prestressed into the blocking position. This can be achieved in a particularly economically priced manner in that the valve member, as explained above, is configured so as to be elastic or at least has an elastic region.

In another embodiment, the valve member can be fastened on the control valve in a stationary region, whilst in an elastic mobile region it is movable or respectively adjustable relative to the control valve. The stationary region can likewise be configured so as to be elastic or else rigid here. Hereby, the non-return check valve has an extremely simple structure and which is therefore able to be realized in a particularly economically priced manner. Here, also, the term "elastic" is to be understood to mean "rubbery-elastic", so that the valve member is deformed elastically in the elastic mobile region owing to the pressure differences apposed thereon, in order to open or to block.

In another embodiment the respectively non-return check valve can be prestressed into its closed position or respectively pressure-controlled, so that in the fresh air position of the control valve it only opens relative to the circulating air inlet starting from a predetermined negative pressure in the fresh air path. In this way, it is ensured that the non-return check valve in the fresh air position only enables an admixing of circulating air when suitable pressure conditions and stable flow conditions prevail for this.

In another embodiment, the control valve can be configured so as to be trough-shaped, wherein a concave inner side of the control valve faces the air outlet. Expediently, the trough-shaped control valve has a convex outer side, which in the fresh air position faces the circulating air inlet and in the circulating air position faces the fresh air inlet. With such a trough-shaped control valve, the contour of the control valve is utilized skillfully for flow deflection, whereby the control device as a whole has a comparatively low through-flow resistance.

In another embodiment, the control device can have a control housing which has the circulating air inlet, the fresh air inlet and the air outlet, wherein the control valve is arranged in this control housing swivellably about a swivel axis. In connection with such a control housing, which can be constructed separately from a remaining housing of the air-conditioning system, the control device can be realized as a unit which is able to be preassembled, which can be installed in the preassembled state into the air-conditioning system. Hereby, the assembly as a whole can be simplified. The swivel axis can be arranged relatively centrally within the control housing. In particular, the swivel axis can extend parallel to an air outlet plane in which the air outlet lies, and/or can extend parallel to a circulating air entry plane, in which the circulating air inlet lies, and or can extend parallel to a fresh air entry plane, in which the fresh air inlet lies.

According to a further development, the control valve can have sealing contours which, in the fresh air position and in the circulating air position, cooperate with counter sealing contours complementary thereto, which are formed on the control housing. On the one hand, the control valve can tightly close the circulating air path by means of the sealing contours and the counter sealing contours in the fresh air position, and can tightly close the fresh air path in the circulating air position. On the other hand, by means of such sealing contours and counter sealing contours, an improved positioning of the sealing valve in the respective position can be achieved, whereby a noise development owing to relative movements between the control valve and the control housing can be prevented or respectively reduced.

The air-conditioning system which is presented here can be equipped in addition in a conventional manner with at least one heating device, for example in the form of a heat exchanger, and with at least one cooling device, for example in the form of a heat exchanger, and with at least one air filter. Likewise, the air-conditioning system can be equipped with a mixing device, in order to be able to mix cooled cold air with heated hot air.

A control device according to the invention comprises the circulating air inlet, the fresh air inlet, the air outlet and the control valve with integrated non-return check valve. Preferably, the control device also comprises the above-mentioned control housing, in order to configure the control device to a unit which is able to be preassembled.

A control valve according to the invention is equipped with at least one non-return check valve constructed thereon, which is associated with a corresponding passage opening of the control valve, so that this passage opening of the control valve is able to be flowed through in one direction and not in the opposite direction.

In an application of the control device according to the invention, this comes into use in an air-conditioning system of the type described above. In an application of the control valve according to the invention, this comes into use in a control device of the type described above or respectively in an air-conditioning system of the type described above.

Further important features and advantages of the invention will emerge from the dependent claims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
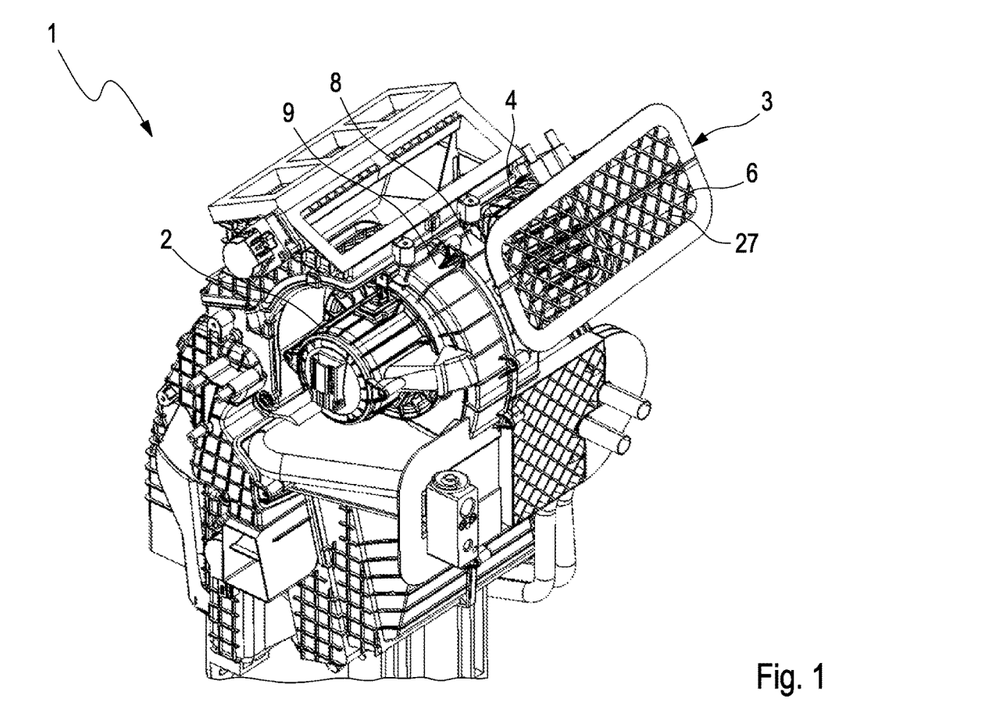
FIG. 1 an isometric view of an air-conditioning system.

According to FIG. 1, an air-conditioning system 1 can have, in addition to a plurality of other conventional components, at least one fan 2 for driving air. In addition, the air-conditioning system 1 comprises a control device 3, by means of which a switchover can be carried out between a circulating air operation and a fresh air operation.

Figure 2:
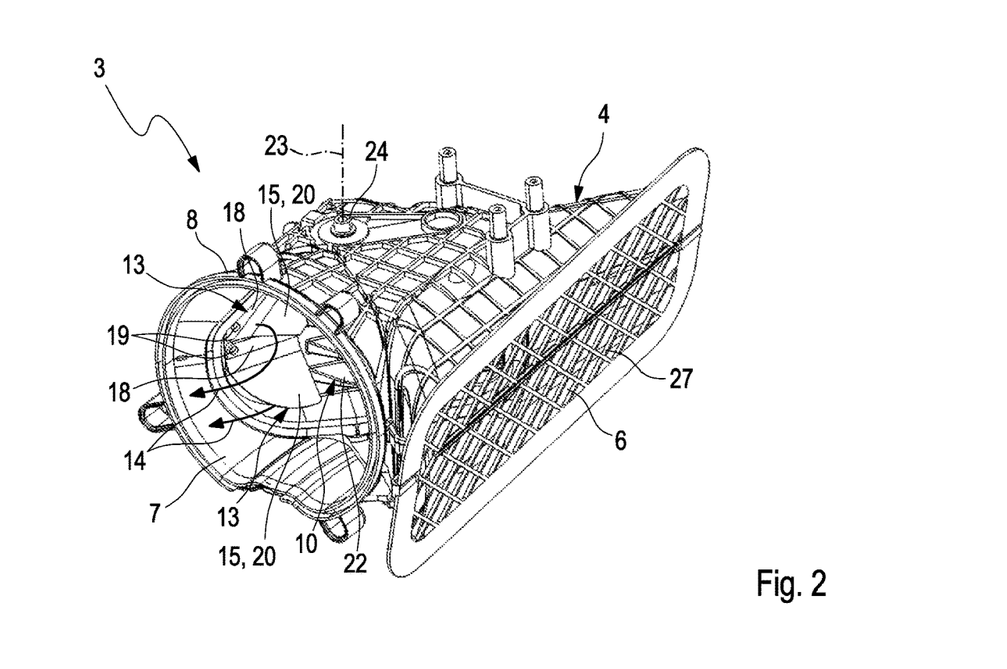
FIG. 2 an isometric view of a control device of the air-conditioning system.
Figure 3:
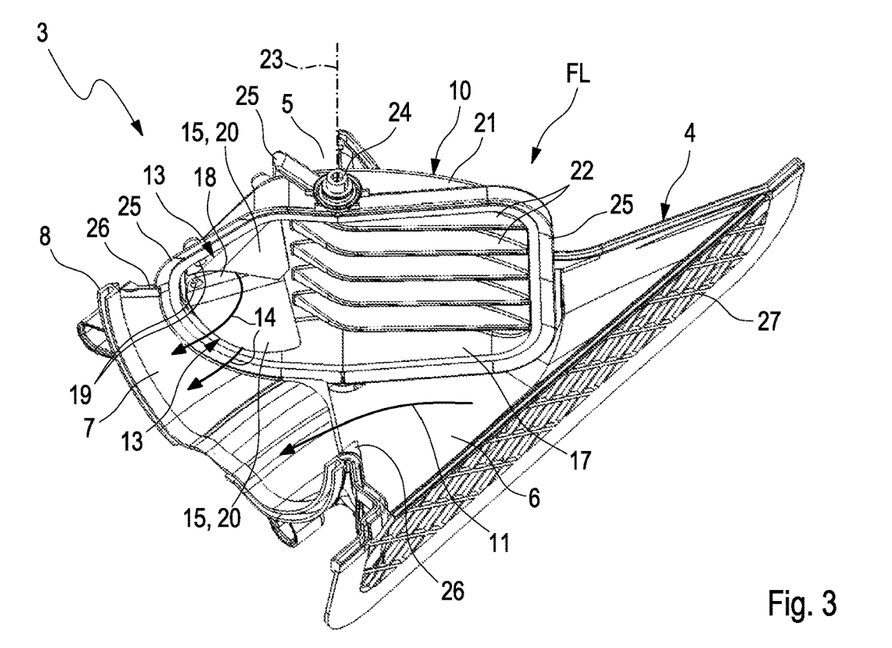
FIG. 3 an isometric sectional view of the control device with a control valve in its fresh air position, FIG. 4 an isometric sectional view of the control device with the control valve in its circulating air position, FIG. 5 an isometric view of the control valve.
Figure 4:
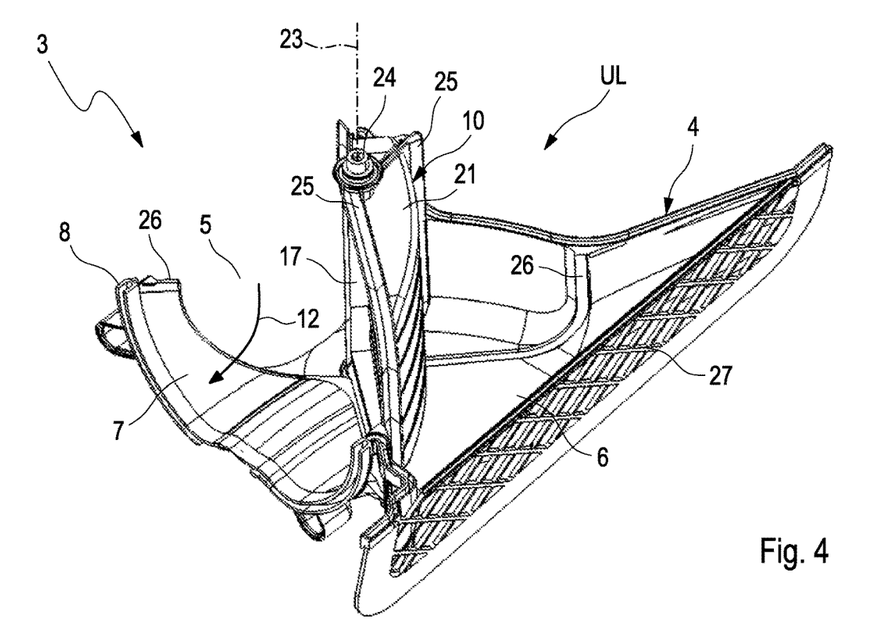

According to FIGS. 2 to 4, this control device 3 can be equipped with a control housing 4, by means of which the control device 3 forms a unit which is able to be preassembled, which can be installed in the preassembled state into the remaining air-conditioning system 1. In any case, the control device 3 comprises a circulating air inlet 5, which can be seen in FIGS. 3 and 4, a fresh air inlet 6, which can be seen in FIGS. 1 and 4, and an air outlet 7 which can be seen in FIGS. 2 to 4. The circulating air inlet 5 serves for the drawing in of circulating air from an interior of a vehicle, which cannot be seen here, which is to be air-conditioned by means of the air-conditioning system 1. The fresh air inlet 6 serves for the drawing in of fresh air from an environment of the vehicle. The air outlet 7 serves for the passing of the drawn-in circulating air or respectively fresh air on to the fan 2. In the example which is shown, the circulating air inlet 5, the fresh air inlet 6 and the air outlet 7 are constructed on the control housing 4. The air outlet 7 is bordered here by a flange 8 of the control housing 4, via which the control housing 4 and therefore the control device 3 can be fastened to a counter flange 9 of the air-conditioning system 1, which in the example is arranged at the inlet or respectively at a suction side of the fan 2.

The control device 3 contains in addition a control valve 10, which can be seen in FIGS. 2 to 5, which is able to be adjusted between a circulating air position UL, illustrated in FIG. 4, and a fresh air position FL illustrated in FIGS. 2 and 3. In the circulating air position UL according to FIG. 4, the control valve 10 closes a fresh air path 11, indicated by an arrow in FIG. 3, which leads from the fresh air inlet 6 to the air outlet 7. At the same time, the control valve 10 in its circulating air position UL frees a circulating air path 12, indicated by an arrow in FIG. 4, which leads from the circulating air inlet 5 to the air outlet 7. If, on the other hand, the control valve 10 is adjusted into its fresh air position FL according to FIG. 3, it closes the circulating air path 12 and opens the fresh air path 11. Both the circulating air position UL and the fresh air position FL are end positions of the control valve 10, which are expediently defined by stops. In a simple embodiment, only these two end positions, i.e. the circulating air position UL and the fresh air position FL are able to be set for the control valve 10. In a convenient embodiment, however, at least one intermediate position is able to be set. Preferably, however, several intermediate positions are able to be set. In particular, a continuous adjustability is provided, so that virtually any desired number of intermediate positions are able to be set.

The control valve 10 is equipped with at least one non-return check valve 13. In the preferred embodiment which is shown here, the control valve 10 is equipped with two such non-return check valves 13, which are configured here in mirror image. It is clear that in another embodiment the control valve 10 can also be equipped with only one single non-return check valve 13. In addition, basically also more than two non-return check valves 13 can be provided.

The respective non-return check valve 13 is configured and arranged on the control valve 10 so that in the fresh air position FL according to FIGS. 2 and 3 it enables a circulating air flow 14, indicated by arrows, from the circulating air inlet 5, which is blocked per se by the control valve 10, through the control valve 10 to the air outlet 7. In contrast thereto, it blocks flows in the opposite direction, i.e. flows oriented from the interior of the control housing 4 to the circulating air inlet 5. The respective non-return check valve 13 has a valve member 15 which is arranged so as to be adjustable and/or movable on the control valve 10. The respective valve member 15 cooperates here with a passage opening 16 formed in the control valve 10, which is completely concealed in FIGS. 2 to 4 and largely concealed in FIG. 5. The cooperation of the respective valve member 15 with the associated passage opening 16 takes place such that the valve member 15 opens the associated passage opening 16 in the through-flow direction and blocks it in the opposite direction.

Figure 5:
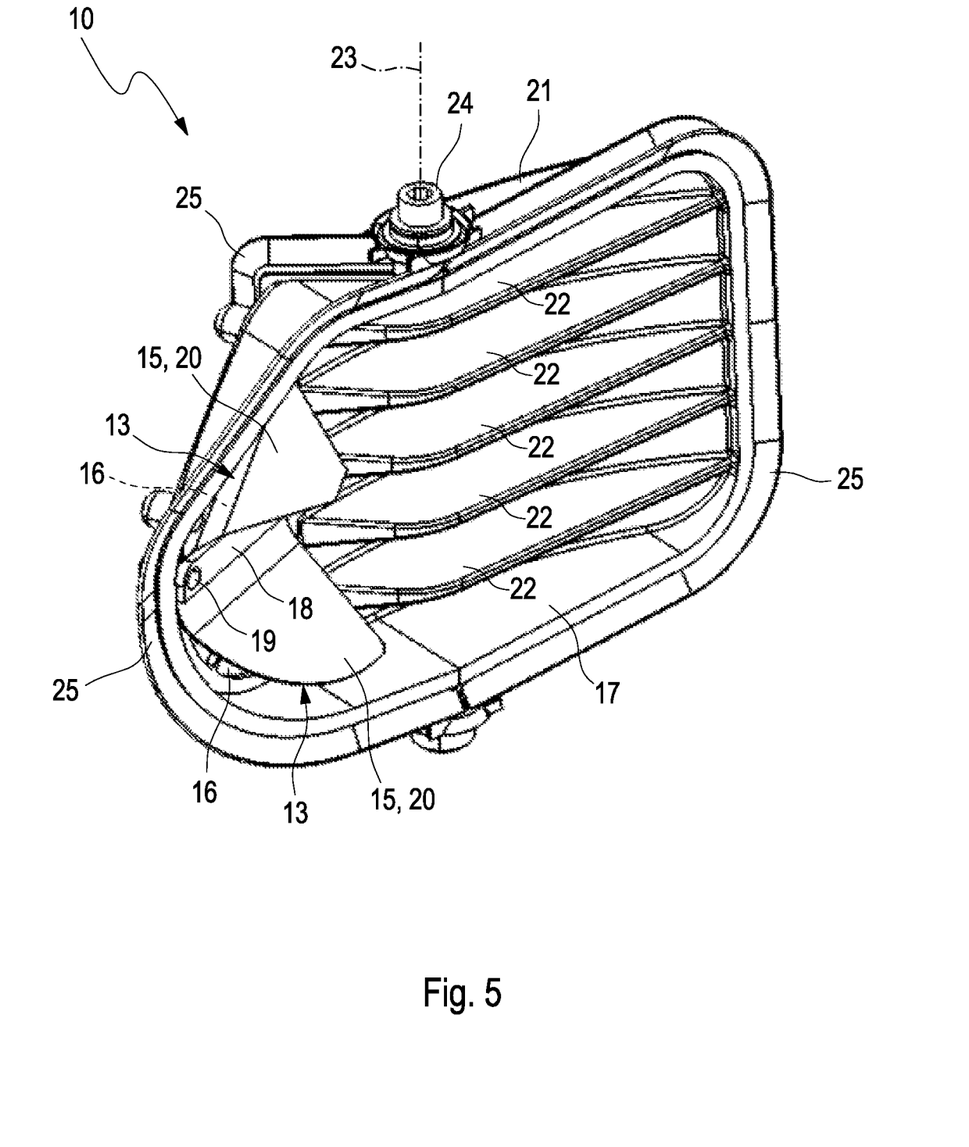

In the examples which are shown here, the non-return check valve 13 is embodied structurally in a particularly simple manner, whereby it is able to be realized accordingly at an economical price. The valve member 15 is expediently formed by a flexible and therefore elastic body, preferably made of plastic. The valve member 15, which is elastic in this respect, is arranged on an inner side 17 of the control valve 10 facing the air outlet 7. The respective valve member 15 is fastened to the control valve 10 at a stationary region 18. In FIGS. 2, 3 and 5, corresponding fastening sites 19 can be seen. Basically, any desired fastening techniques are conceivable. For example, the respective valve member 15 can be welded or glued to the control valve 10. Likewise, screwed and riveted connections are conceivable. A spot welding of the valve member 15 of plastic on the control valve 10, which preferably likewise consists of plastic, is preferred. The respective valve member 15 is then movable or respectively adjustable in a mobile region 20 relative to the control valve 10. At least in the mobile region 20, the valve member is therefore elastic. Expediently, the stationary region 18 is also elastic; however, this is not compulsory.

The respective non-return check valve 13 is preferably pressure-controlled or respectively prestressed into its closed position, so that it is basically closed in the fresh air position FL of the control valve 10, i.e. closes the respective passage opening 16 with the control valve 10. The non-return check valve 13 only opens in the case of a predetermined negative pressure in the fresh air path 11 relative to the circulating air inlet 5, in order to enable the above-mentioned circulating air flow 14.

In the example which is shown here, the control valve 10 is configured so as to be trough-shaped, wherein the inner side 17 is shaped so as to be concave, whilst an outer side 21 of the control valve 10, facing away from the inner side 17, is shaped so as to be convex. On the inner side 17 in addition flow guide ribs 22 are formed, which run parallel to one another and which enable a flow alignment both in the circulating air position UL and also in the fresh air position FL. At the same time, the flow guide ribs 22 lead to an intensive reinforcement of the control valve 10.

The control valve 10 is swivellably mounted in the control housing 4 about a swivel axis 23. A bearing pin 24 of the control valve 10 can be dimensioned here so that in accordance with FIG. 2 it penetrates the control housing 4 and forms on the outer side of the control housing 4 a coupling site for an actuating drive, which is not shown here, by means of which the control valve 10 can be driven, in order to swivel it between its circulating air position UL and its fresh air position FL. The sealing contours 25 form with the associated counter sealing contours 26 the above-mentioned stops for defining the end positions.

As can be seen from FIGS. 3 to 5, the control valve 10 is expediently equipped with sealing contours 25 which in the fresh air position FL and in the circulating air position UL cooperate with counter sealing contours 26, which are illustrated in FIGS. 3 and 4 and which are formed on the control housing 4. In this way, undesired leakage flows can be prevented.

The control housing 4 is equipped here in addition in the region of the fresh air inlet 6 with an inlet grid 27, against which for example a fresh air filter can rest.

The invention claimed is:

1. An air-conditioning system for air-conditioning an interior of a vehicle, comprising:
    a fan for driving air;
    a control device including a circulating air inlet for drawing in circulating air from the interior, a fresh air inlet for drawing in fresh air from an environment of the vehicle, and an air outlet for passing at least one of circulating air and fresh air drawn in to the fan;
    the control device further including an adjustable control valve, the control valve adjustable at least between a circulating air position, in which the control valve closes a fresh air path leading from the fresh air inlet to the air outlet and opens a circulating air path leading from the circulating air inlet to the air outlet, and a fresh air position, in which the control valve closes the circulating air path and opens the fresh air path;
    the control valve including at least one non-return check valve, the at least one non-return check valve in the fresh air position structured to permit a circulating air flow in a through-flow direction from the circulating air inlet through the control valve to the air outlet when the circulating air path is closed by the control valve and block the circulating air flow in an opposite direction;
    wherein the non-return check valve includes an at least partially elastic valve member arranged at least one of adjustably and movably on an inner side of the control valve facing towards the air outlet, the valve member cooperating with a passage opening defined in the control valve to open the passage opening in the through-flow direction and to block the passage opening in the opposite direction when the circulating air path is closed by the control valve in the fresh air position;
    wherein the valve member is configured and arranged to deform elastically when adjusting between a blocking position where the valve member blocks the passage opening, and an open position where the valve member opens the passage opening, and wherein the valve member is elastically deformed in the open position and elastically prestressed into the blocking position such that valve member is elastically prestressed in a direction of the blocking position when the valve member is in the open position;
    wherein the control valve is adjustable about a swivel axis and has a trough-shaped body, the trough-shaped body structured concave on the inner side of the control valve facing towards the air outlet; and
    wherein the trough-shaped body includes a plurality of flow guide ribs disposed on the inner side of the control valve and arranged spaced apart from one another in an axial direction of the swivel axis, the plurality of flow guide ribs projecting outwardly from the trough-shaped body in a transverse direction of the swivel axis and extending parallel to one another in a radial direction of the swivel axis to define grooves provided along the inner side of the trough-shaped body to facilitate flow alignment in the circulating air position and the fresh air position, the transverse direction running transversely to the axial direction and the radial direction.

2. The air-conditioning system according to claim 1, wherein the valve member of the non-return check valve is coupled to the trough-shaped body on the inner side of the control valve and cooperates with the passage opening to open the passage opening in the through-flow direction and to block the passage opening in the opposite direction when the circulating air path is closed by the valve body in the fresh air position.

3. The air-conditioning system according to claim 1, wherein the valve member is relaxed and elastically undeformed in the blocking position.

4. The air-conditioning system according to claim 1, wherein the valve member is secured to the control valve in a stationary region, wherein the valve member includes an elastic mobile region at least one of movable and adjustable relative to the control valve, and wherein the elastic mobile region is composed of a rubbery-elastic material.

5. The air-conditioning system according to claim 1, wherein the non-return check valve only opens relative to the circulating air inlet starting from a predetermined negative pressure in the fresh air path when the control valve is in the fresh air position.

6. The air-conditioning system according to claim 1, wherein the trough-shaped body has an outer side with a convex shape, the outer side disposed opposite the inner side of the control valve.

7. The air-conditioning system according to claim 1, wherein the control device further includes a control housing, the control housing defining the circulating air inlet, the fresh air inlet and the air outlet, and wherein the control valve is swivellably arranged in the control housing about the swivel axis.

8. The air-conditioning system according to claim 7, wherein the control valve has a peripheral sealing contour surrounding the trough-shaped body, wherein the sealing contour engages a counter sealing contour disposed on the control housing and the trough-shaped body closes the circulating air path in the fresh air position, and the sealing contour engages another counter sealing contour disposed on the control housing and the trough-shaped body closes the fresh air path in the circulating air position, and wherein the non-return valve is arranged on the trough-shaped body.

9. A control device for an air-conditioning system, comprising:
a circulating air inlet, a fresh air inlet, and an air outlet;
a fresh air path leading from the fresh air inlet to the air outlet;
a circulating air path leading from the circulating air inlet to the air outlet;
a control valve arranged between (i) the circulating air inlet and the fresh air inlet and (ii) the air outlet, the control valve adjustable about an axis between a circulating air position where the control valve closes the fresh air path and opens the circulating air path, and a fresh air position where the control valve closes the circulating air path and opens the fresh air path; and
at least one non-return check valve arranged on the control valve, the at least one non-return check valve structured to permit a circulating air flow in a through-flow direction from the circulating air inlet through the control valve to the air outlet and block the circulating air flow in the opposite direction when the circulating air path is closed by the control valve in the fresh air position;
the non-return check valve including an at least partially elastic valve member arranged at least one of adjustably and movably on an inner side of the control valve facing towards the air outlet, the valve member cooperating with a passage opening defined in the control valve to open the passage opening in the through-flow direction and to block the passage opening in the opposite direction when the circulating air path is closed by the control valve in the fresh air position;
wherein the control valve has a trough-shaped body provided by a concave contour on the inner side of the control valve disposed between outer side walls, the valve member of the non-return check valve coupled to the trough-shaped body on the inner side of the control valve; and
wherein the control valve includes a plurality of flow guide ribs disposed on the trough-shaped body, the plurality of flow guide ribs arranged on the inner side of the control valve spaced apart from one another in an axial direction of the axis and extending parallel to one another in a radial direction of the axis along the concave contour on the inner side of the control valve, and wherein the plurality of flow guide ribs project outwardly from the trough-shaped body in a transverse direction of the axis and define grooves provided along the inner side of the trough-shaped body to facilitate flow alignment in the circulating air position and the fresh air position, the transverse direction running transversely to the axial direction and the radial direction.

10. The control device according to claim 9, wherein the valve member is secured to the control valve in a stationary region, wherein the valve member includes an elastic mobile region that is at least one of movable and adjustable relative to the control valve.

11. The control device according to claim 9, wherein the non-return check valve is operable to open relative to the circulating air inlet in response to exceeding a predetermined negative pressure in the fresh air path.

12. The control device according to claim 9, further comprising a control housing defining the circulating air inlet, the fresh air inlet and the air outlet;
wherein the control valve further includes a peripheral sealing contour surrounding the trough-shaped body, wherein the sealing contour engages a counter sealing contour disposed on the control housing and the trough-shaped body closes the circulating air path in the fresh air position of the control valve, and the sealing contour engages another counter sealing contour disposed on the control housing and the trough-shaped body closes the fresh air path in the circulating air position of the control valve.

13. A control device for an air-conditioning system, comprising:
a control housing including a fresh air inlet, a circulating air inlet, and an air outlet;
a fresh air path for communicating fresh air extending in the control housing from the fresh air inlet to the air outlet;
a circulating air path for communicating circulating air extending in the control housing from the circulating air inlet to the air outlet;
a control valve having a valve body arranged to swivel in the control housing about a swivel axis, the valve body adjustable at least between a circulating position where the valve body closes the fresh air path and opens the circulating air path, and a fresh air position where the valve body closes the circulating air path and opens the fresh air path, the control valve provided with a passage opening defined in the valve body and including at least one peripheral sealing contour surrounding the valve body, wherein the at least one peripheral sealing contour engages a counter sealing contour disposed on the control housing in the circulating position to close the fresh air inlet and engages another counter sealing contour disposed on the control housing in the fresh air position to close the circulating air inlet;
at least one non-return check valve including a valve member cooperating with the passage opening, the valve member secured to the valve body on an inner side of the control valve facing towards the air outlet, the valve member including an elastic mobile region at least one of movable and adjustable relative to the control valve;
wherein the valve member is movable to open the passage opening to a circulating air flow in a through-flow direction through the valve body from the circulating air inlet to the air outlet and block the passage opening to stop the circulating air flow in an opposite direction when the circulating air path is closed by the valve body in the fresh air position; and
wherein the valve body has a trough-shaped structure defining a concave contour on the inner side of the control valve, the valve body further including a plurality of flow guide ribs extending in a radial direction of the swivel axis along the concave contour on the inner side and surrounded by the at least one peripheral sealing contour, the plurality of flow guide ribs disposed spaced apart from one another in an axial direction of the swivel axis, extend parallel to one another in the radial direction, and project outwardly from the inner side in a transverse direction of the swivel axis, the transverse direction running transversely to the axial direction and the radial direction, and wherein the plurality of flow guide ribs define grooves provided along the concave contour on the inner side to facilitate flow alignment in the circulating position and the fresh air position.

14. The control device according to claim 13, wherein the valve member is configured and arranged to deform elastically when adjusting between a blocking position where the valve member blocks the passage opening, and an open position where the valve member opens the passage opening, and wherein the valve member is elastically deformed in the open position and elastically prestressed into the blocking position such that valve member is elastically prestressed in a direction of the blocking position when the valve member is in the open position.

* * * * *